United States Patent [19]
Parsons

[11] Patent Number: 5,009,114
[45] Date of Patent: Apr. 23, 1991

[54] MECHANISM FOR TRANSMITTING ROTATIONAL MOTION FROM ONE SHAFT TO ANOTHER

[75] Inventor: Bryan N. V. Parsons, Stoney Stanton, United Kingdom

[73] Assignee: Jaguar Cars Limited, England

[21] Appl. No.: 439,786

[22] Filed: Nov. 21, 1989

[30] Foreign Application Priority Data

Nov. 24, 1988 [GB] United Kingdom ............... 8827432

[51] Int. Cl.$^5$ .................... F16H 21/00; F01L 1/00
[52] U.S. Cl. .................................. 74/15.63; 74/65; 74/67; 123/90.31; 475/162; 475/174
[58] Field of Search .................. 74/15.63, 63, 65, 66, 74/67, 68, 69; 123/90.31; 475/162, 174

[56] References Cited

U.S. PATENT DOCUMENTS

| | | | | |
|---|---|---|---|---|
| 1,392,597 | 10/1921 | Ricardo | .............................. | 74/67 X |
| 1,537,832 | 5/1925 | Lafitte | .................................. | 74/69 |
| 1,971,885 | 8/1934 | Viale | ................................... | 74/68 |
| 4,674,361 | 6/1987 | Parsons | ................................ | 74/804 |

FOREIGN PATENT DOCUMENTS

| | | |
|---|---|---|
| 340544 | 7/1904 | France. |
| 212102 | 7/1924 | United Kingdom ................... 74/67 |
| 294394 | 9/1927 | United Kingdom. |
| 372486 | 3/1931 | United Kingdom. |
| 905082 | 9/1962 | United Kingdom ................... 74/68 |
| 2160612 | 12/1985 | United Kingdom. |

Primary Examiner—Allan D. Herrmann
Assistant Examiner—David W. Laub
Attorney, Agent, or Firm—Davis, Bujold & Streck

[57] ABSTRACT

A mechanism for transmitting rotational motion from an input shaft to an output shaft includes a link which is constrained to move about an orbital path, the input shaft being coupled to the link so that rotation thereof will drive the link about its orbital path, and the output shaft being coupled to the link so that orbital motion of the link will cause the output shaft to rotate. One of the shafts is coupled to the link by means of a pair of interengaging components, one component being provided on the shaft for rotation therewith and the other component being pivotally mounted on the link, the pivotal axis of the component moving in a circular path upon rotation of the link, the axis of said circular path coinciding with the axis of rotation of the link, a lever being pivotally connected at one end to the component mounted on the link and at the other end to a pivot isolated from movement of the link, so that upon movement of the link about its orbital path an oscillatory rotation will be imposed on the component mounted on the link thus providing a sinusoidal variation in rotation of the shaft relative to the link.

10 Claims, 3 Drawing Sheets

MECHANISM FOR TRANSMITTING ROTATIONAL MOTION FROM ONE SHAFT TO ANOTHER

BACKGROUND TO THE INVENTION

The invention relates to a mechanism for transmitting rotational motion from one shaft to another.

In accordance with UK Patent No. GB 2160612B, a mechanism for transmitting rotational motion from one shaft to another which is parallel to the first, comprises a link which is constrained to perform an orbital motion, the shafts being connected to the link by cranks or by internal/external gear sets.

It is however desirable in certain applications, for example in the drive for inlet and exhaust valves of an internal combustion engine, to provide an output of variable velocity.

The present invention provides a mechanism for transmitting rotational motion from one shaft to another and varying the velocity at which the output shaft is driven.

SUMMARY OF THE INVENTION

According to one aspect of the present invention, a mechanism for transmitting rotational motion from one shaft to another comprises a link which is constrained to move in an orbital path, an input shaft being coupled to the link so that rotation of the input shaft will cause the link to move in its orbital path; and an output shaft parallel to the said input shaft, said output shaft being coupled to the link so that orbital motion of the link will cause the output shaft to rotate; the coupling between one shaft and the link including interengaging components the relative positions of which vary as the link is driven in its orbital path, one component being mounted on the shaft for rotation therewith and the other component being mounted on the link for pivotal movement relative thereto, the component being positioned such that as the link is driven in its orbital path, the pivotal axis will prescribe a circular path concentric with the axis of rotation of the shaft, a lever being pivotally connected at one end to the component mounted on the link and at the other end to a pivot which is isolated from the movement of the link.

With the above mechanism, as the link is driven in its orbital path, inter-engagement of the component mounted on the link with that on the shaft, will cause rotation of the shaft. However, as the link moves in its orbital path, the lever will cause the component mounted on the link to rotate about its pivot, the degree and velocity of this movement depending upon the relative position of the isolated pivot and the link in its orbital path. This imposed rotation of the component mounted on the link will thus cause a periodic variation in the velocity at which the shaft is driven. The variation in velocity of the shaft and phase relationship will depend upon the radius of the orbital path of the link, the position of the isolated pivot and the length of the lever. These dimensions may be selected to provide the required variable drive profile.

In some applications, it is desirable that the phase of the variable drive may be varied and this may be achieved by altering the position of the isolated pivot by means of a suitable mechanism. Futhermore, the variation in velocity may be adjusted by varying the length of the lever and this may be achieved by use of a suitable linkage or an axially extendable lever mechanism.

BRIEF DESCRIPTION OF THE DRAWINGS

Various embodiments of the invention are now described, by way of example only, with reference to the accompanying drawings, in which.

DESCRIPTION OF A PREFERRED EMBODIMENT

Figure 1:
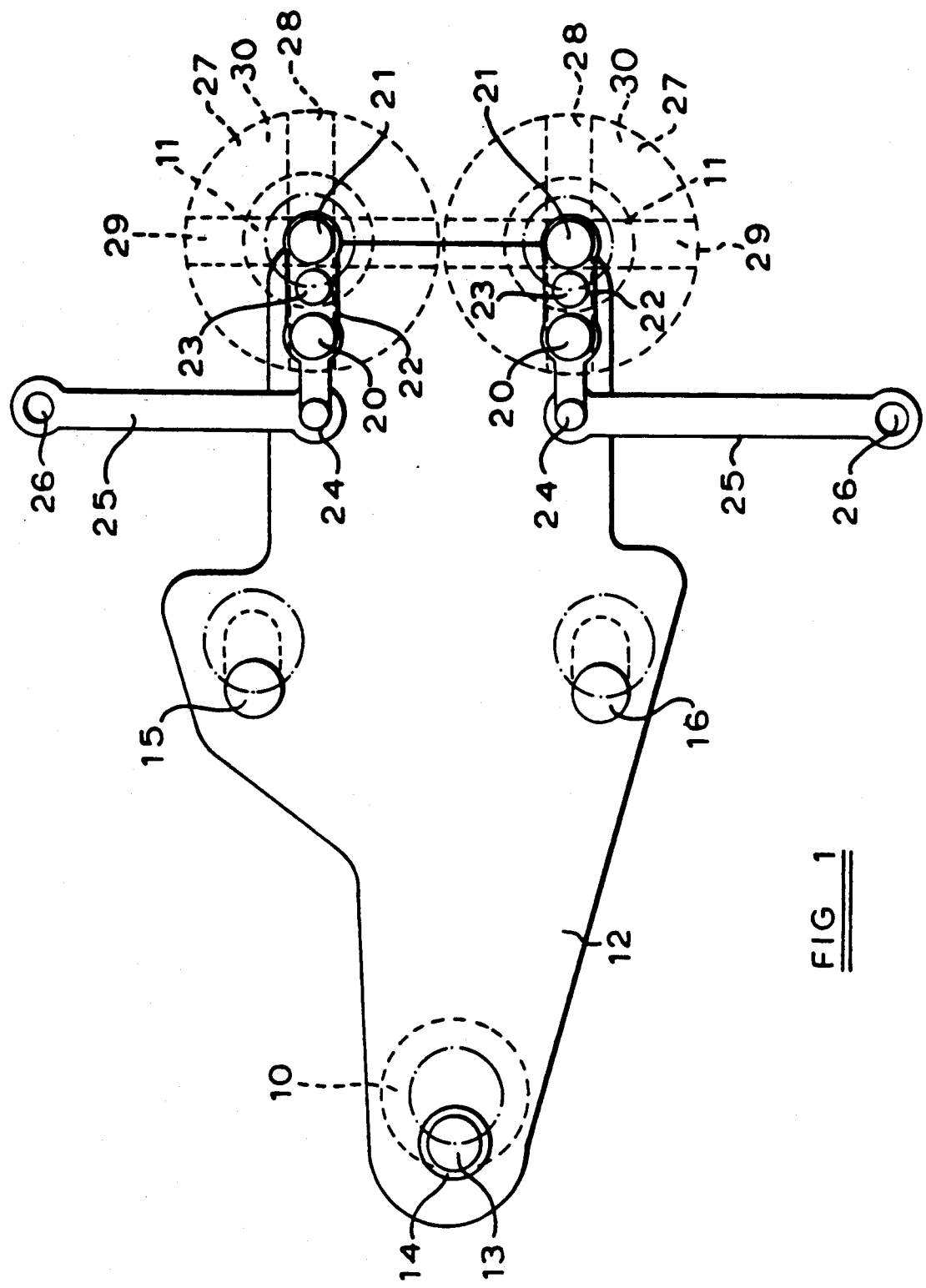
FIG. 1 illustrates a mechanism for transmitting rotational motion from one shaft to another in accordance with the present invention.

FIGS. 1 to 5 illustrate a mechanism for connecting the crank shaft 10 of an internal combustion engine to a pair of cam shafts 11.

The crank shaft 10 is connected to a link 12 by means of a crank 13 which engages in a bearing 14 in the link 12. A pair of idler cranks 15 and 16 of equal throw to the crank 13 and mounted for rotation about axes parallel to the axis rotation of the crank shaft 10, are mounted at non-linear positions space from the crank shaft 10, in order to constrain the link 12 so that it will move in an orbital path when driven by the crank shaft 10.

The couplings between the link 12 and the cam shafts 11 are of identical construction and only one is described in detail below. The same reference numerals have been used for identical components.

The coupling between the link 12 and cam shaft 11 comprises a pair of pins 20 and 21 which are mounted upon arm 22 which is pivotally attached to the link 12 by means of pivot 23. The pins 20 and 21 are located on arm 22, so that they are equidistant from the pivot 23, the circular paths prescribed by the pins 20 and 21 as the link 12 is driven about its orbital path, coinciding tangentially. The end of the arm 22 remote from pins 20 and 21 is connected by pivot 24 to one end of a lever 25, the other end of lever 25 engaging a pivot 26.

The cam shaft 11 is mounted for rotation about an axis parallel to the axis of rotation of the crank shaft 10, said axis passing through the centre of the circular path prescribed by pivot 23, as the link 12 moves in its orbital path. The crank shaft 11 has a flange formation 27 at the end adjacent link 12. A pair of diametric grooves 28 and 29, one at right angles to the other, are provided in the radical end face 30 of the flange formation 27 and the pins 20 and 21 engage one in each of the grooves 28 and 29.

Upon rotation of the crank shaft 10, the link 12 is driven in an orbital path causing the pins 20 and 21 to move in circular paths. Engagement of the pins 20 and 21 in grooves 28 and 29 respectively, will cause the cam shaft 11 to rotate. Relative movement between link 12 and the pivot 26 will however cause lever 25 to rotate arm 22 about pivot 23.

Figure 2:
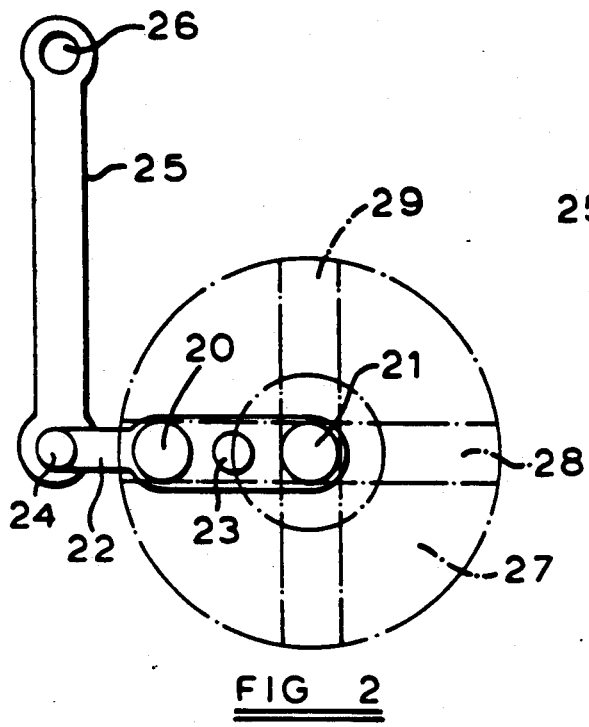
FIGS. 2 to 5 illustrate the sequential progression of one of the couplings of the mechanism illustrated in FIG. 1, for one rotation of the input shaft.
Figure 3:
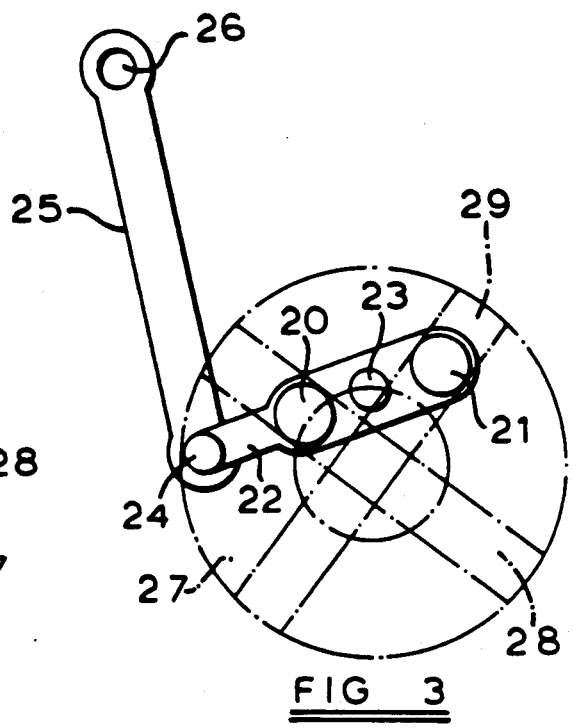
Figure 4:
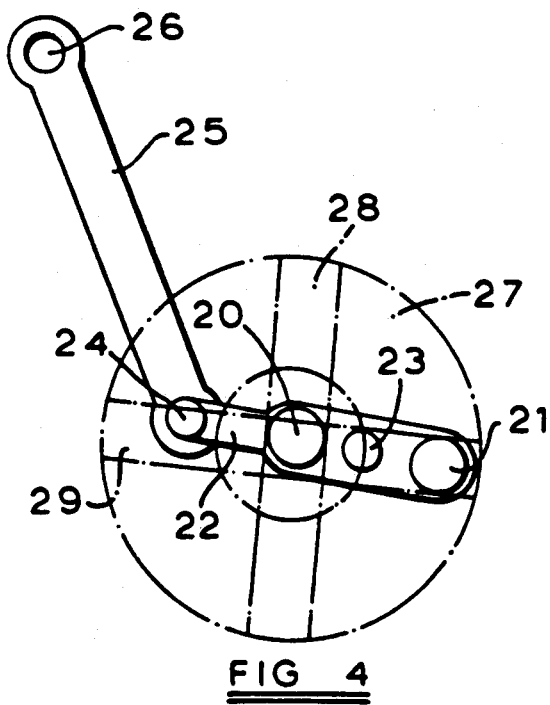
Figure 5:
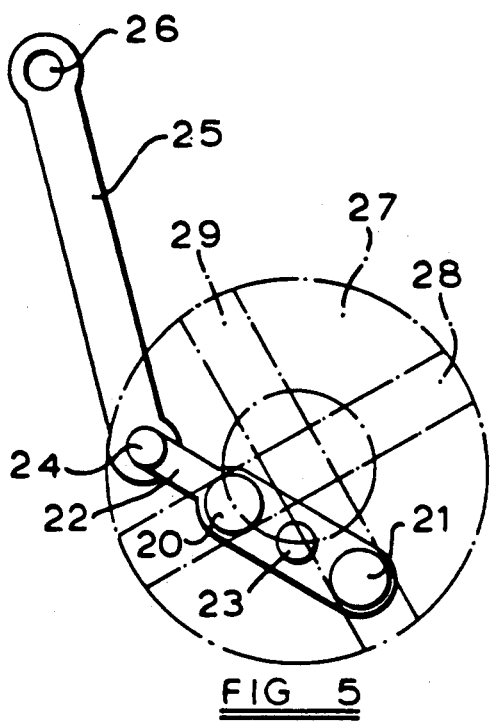

As a result of the rotation of arm 22, starting from the position illustrated in FIGS. 1 and 2, the pins 20 and 21 will initially be rotated anticlockwise relative to the link 12, as illustrated in FIG. 3. As the link 12 moves around its orbital path towards a position disposed at 180 degrees to that illustrated in FIG. 1, the pins 20 and 21 move back into phase with the link 12, as illustrated in FIG. 4. On the return part of the orbital path of the link 12, the pins 20 and 21 will be rotated clockwise ahead of the link as illustrated in FIG. 5, finally moving back into phase with the link at the end of its orbital path as illustrated in FIG. 2. During this rotation of the link 12, the cam shaft is driven through 180 degrees giving a 2:1 reduction in drive as required. As illustrated in FIGS. 2 to 5, which represent 90 degree intervals of rotation of the crank shaft 10 and link 12, the cam shaft will move something of the order of 35 degrees from FIG. 2 to FIG. 3, 50 degrees from FIG. 3 to FIG. 4, 50 degrees from FIG. 4 to FIG. 5, and 35 degrees from FIG. 5 to FIG. 2, that is, approximately 55% of the movement of the cam shaft 11 will occur in movement of the crank shaft 10 from 90 degrees to 270 degrees.

The variation in the velocity of cam shaft 11 will depend upon the radius of the orbital path of the link 12, the position of the pivot 26 relative to the link 12 and the distances between pivots 23 and 24 and pivots 24 and 26 which may be selected to provide the required timing. Means (not shown) may be provided for movement of pivot 26 in order to rotate the arm 22 thereby rotating pins 20 and 21 and the cam shaft 11 relative to the link 12 and altering the phase relationship between cam shaft 11 and crank shaft 10.

Figure 6:
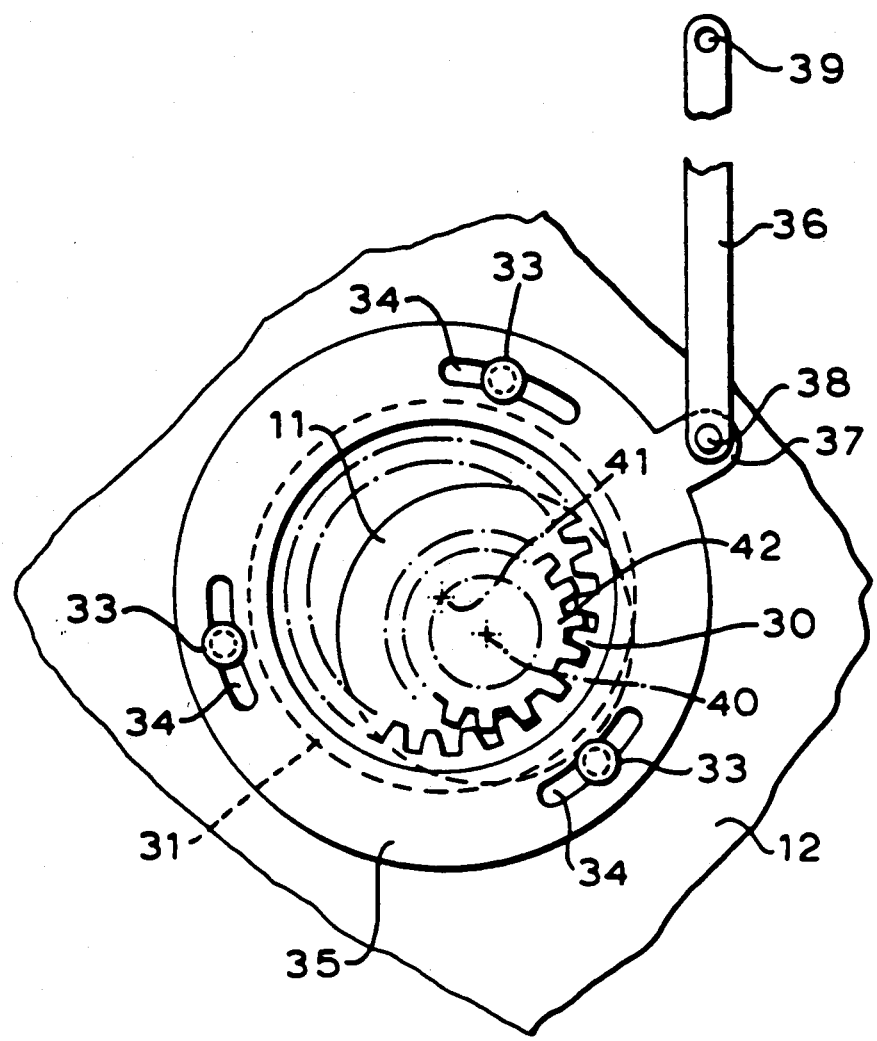
FIG. 6 illustrates an alternative form of coupling which may be used in the mechanism illustrated in FIG. 1.

In the alternative embodiment illustrated in FIG. 6, an internal gear 30 is mounted in an aperture 31 in the link 12, the gear 30 being secured to the link 12, for rotation relative thereto, by means of three rivets 33 which engage in arcuate holes 34 in a radially extending flange formation 35 on the gear 30. A lever 36 is attached at one end to a lug 37 extending radially from the flange formation 35 by pivot 38 and at the other end to a pivot 39.

A cam shaft 11 is mounted for rotation about an axis 40 which passes through the centre of the circular path proscribed by the axis of rotation 41 of the internal gear 30 and an external gear 42 is provided on the end of the cam shaft 11 to engage the internal gear 30.

With this embodiment, as the link 12 is driven about its orbital path, engagement of the external gear 42 by the internal gear 30 will cause the external gear 42 and the cam shaft 11 to rotate, the drive ratio which depends upon the ratio of the gears 30 and 42, being two to one. While a two to one drive ratio is normally required for cam shaft drives, for other applications other drive ratios may be achieved by altering the ratio of the gears 30 and 42.

As with the embodiment described with reference to FIGS. 1 to 5, engagement of the internal gear 30 by lever 36 will cause rotation of the internal gear 30 relative to link 12, which will impose a variation on the velocity at which the cam shaft 11 is driven. As with the previous embodiment, the velocity profile and phase relationship may be set by a suitable selection of the radius of the orbital path of link 12, the position of the pivot 39 and the dimensions of the lever 36 and distance between pivot 38 and the axis of rotation 41 of the internal gear 30. Provision may also be provided for movement of the pivot 39 and/or adjustment of the geometry of the mechanism to provide for variation in the phase relationship and/or velocity profile.

Various modifications may be made without departing from the invention. For example, while in the above embodiments, the drive is transmitted from the input shaft to the link by means of a crank, the input shaft may alternatively be coupled to the link by a gear set or pin and groove mechanism. The mechanism covered by the present application may also be used to transmit drive to any number of output shafts. Where a plurality of shafts are driven by the link 12, one or more may be driven at variable velocity in the manner described above, other shafts being driven at constant velocity through crank, gear or pin and groove couplings without provision for rotation relative to the link 12. Although in the embodiment illustrated in FIGS. 1 to 5, two pins are provided on the link 12, more than two pins may be provided, each engaging in a separate groove associated with the output shaft.

Instead of using idler cranks 15 and 16 to constrain the link 12 to move in an orbital path, other means, for example an Oldham linkage, may be used for this purpose.

I claim:

1. A mechanism for transmitting rotational motion from an input shaft to an output shaft comprising a link constrained to move in an orbital path, the input shaft being coupled to the link so that rotation of the input shaft will move the link in its orbital path; and the output shaft being parallel to the said input shaft and coupled to the link so that orbital motion of the link will rotate the output shaft; the coupling between at least one of the shafts and the link including interengaging components the relative positions of which vary as the link moves in its orbital path, one of said compenents being mounted on the said one of the shafts for rotation therewith and another of said components being mounted on the link for pivotal movement relative thereto, the component mounted on the link being positioned such that as the link moves in its orbital path, and axis of the pivotal movement will describe a circular path concentric with the axis of rotation of the said one of the shafts, a lever being pivotally connected at one end to the component mounted on the link and at its other end to a pivot which is isolated from the movement of the link.

2. A mechanism according to claim 1 in which one component of said coupling defines a plurality of pins, said other component defining a separate groove for each of said pins, the grooves intersecting at a common point.

3. A mechanism according to claim 2 in which a pair of pins are provided on an arm which is pivotally mounted to the link, the pins being located on the arm so that they are equidistant from the axis of rotation thereof relative to the link, the circular paths proscribed by the pins as the link is driven about its orbital path coinciding tangentially, the shaft being mounted for rotation about an axis passing through the centre of the circular path described by the axis of rotation of the arm as the link moves in its orbital path and the component of the coupling associated with the shaft defining a pair of diametric grooves, one at right angles to the other.

4. A mechanism according to claim 3 in which the lever is pivotally connected to the end of the arm remote from the pins.

5. A mechanism according to claim 1 in which one component of the coupling is an internal gear and the other component of the coupling is an external gear.

6. A mechanism according to claim 5 in which the internal gear is mounted for rotation on the link the shaft being mounted for rotation about an axis which passes through the centre of the circular path described by the axis of rotation of the internal gear as the link is driven in its orbital path, and an external gear being provided on the end of the shaft to engage the internal gear.

7. A mechanism according to claim 6 in which the internal gear is mounted in an aperture in the link, the internal gear being secured to the link by means of three or move rivets which engage in arcuate holes in a radially extended flange formation on the internal gear.

8. A mechanism according to claim 7 in which the lever is pivotally connected to a lug formation on the radially extending flange of the internal gear.

9. A mechanism according to claim 1 in which means is provided for selectively adjusting the position of the isolated pivot.

10. A mechanism according to claim 1 in which means is provided for selectively adjusting the effective length of the lever.

* * * * *